INVENTOR.
CHARLES S. WRIGHT
BY
LeBlanc & Shur
ATTORNEYS.

United States Patent Office 3,249,863
Patented May 3, 1966

3,249,863
OPERATING IMPEDANCE DETERMINING DEVICE HAVING A COUPLING UNIT UTILIZING A PICK-UP LINE TERMINATED IN A VARIABLE IMPEDANCE
Charles S. Wright, Springfield, Va., assignor to Delta Electronics, Inc., Alexandria, Va., a corporation of Virginia
Filed Aug. 21, 1962, Ser. No. 218,288
10 Claims. (Cl. 324—57)

This invention relates to an impedance measuring or monitoring device and more particularly relates to a device for either monitoring or measuring the operating impedance of a load under power.

While a wide variety of devices are available for accurately measuring impedance, the vast majority of such devices are intended for use only to determine the self impedance of de-energized impedances. Other impedance measuring devices which are capable of determining the impedance of an energized impedance are generally designed for operation at reduced power in that the device usually has a relatively high insertion loss. As opposed to the foregoing devices, there are available, particularly in the radio field, qualitative measuring and indicating devices which are capable of functioning in a circuit operating at a normal power input or output. As an example, it is common to employ a reflectometer type circuit for the measurement of forward and reverse power and standing wave ratio in radio transmission lines. Such arrangements, however, are not capable of providing quantitative impedance measurements nor are they readily adapted to continuous monitoring of operating impedance under normal operating conditions.

Despite the fact that the present state of the art makes such an operation difficult, it is frequently desirable to measure or monitor the operating impedance of a load under normal operating power. The term "operating impedance," as used here, is defined as the ratio of the voltage across the terminals of the load to the current passing through the terminals of the load when the load is operating in its normal environment with normal operating power. One example of an instance in which a measurement of operating impedance is frequently desirable is the determination of the operating impedance of an antenna of a broadcast or other type radio station. One radiator of a directional antenna exhibits an operating impedance which may differ substantially from its self impedance due to mutual coupling between adjacent radiators. Many loads are non-linear in character with an operating impedance which varies according to the power applied. As a simplified illustration of one such impedance, reference is directed to the ordinary incandescent light bulb, which exhibits a very low impedance under small measuring current, but a relatively high impedance when the current is sufficient to heat the filament to incandescence.

According to the present invention, there is provided a device capable of either measuring or monitoring the operating impedance of a load under power with a minimum insertion loss. The unit of the invention involves the use of a short section of transmission line to be inserted in the line feeding the load, and a second section of transmission line coupled to the first and being connected to a meter circuit and to impedance means. Such an arrangement is found in reflectometer type circuits, such as, for example, the circuit illustrated in U.S. Patent No. 2,523,254. As is well known, when a pick-up section of transmission line of this type is terminated at one end in its characterstic impedance the energy flow through the main transmission line may be measured as a voltage at the other end of the pick-up transmission line.

The present invention involves, among other things, the discovery that the pick-up line may be terminated in an impedance other than its characterstic impedance, and that when this impedance is such as to balance the currents in the pick-up transmission line flowing to the meter circuit, the value of the impedance in which the pick-up line is terminated is a known function of the operating impedance of the load to which the first transmission line is connected. Thus, by calibrating this impedance an accurate measuring device is obtained. Alternately, by using the current in the meter circuit as a control current an impedance monitor or alarm may be obtained.

The unit is comprised of relatively inexpensive components and is adapted to provide either accurate quantitative measurement of operating impedance or a monitoring of operating impedance so as to indicate a deviation from such impedance or to energize an alarm or other circuit upon deviation from such impedance by more than a predetermined amount.

It is accordingly a primary object of the present invention to provide an improved device for measuring or monitoring the operating impedance of a load under power.

It is another object of the invention to provide an improved device for measuring or monitoring the operating impedance of a load under power wherein the device produces a minimum of insertion effect.

It is another object of the invention to provide an improved device for measuring or monitoring the operating impedance of a load under power which does not require the provision of unusual or expensive impedances of either a fixed or variable type.

It is another object of the invention to provide an improved device for measuring the operating impedance of a load under power which is relatively simple in construction, low in cost, and simple to operate.

It is another object of the invention to provide a device for measuring or monitoring operating impedance comprising a coupling unit containing a first section of transmission line adapted to be connected in the feed line of the operating impedance to be measured, and a second section of transmission line lightly coupled to the first and connected at spaced positions to a meter circuit and to impedance means, with the impedance means being so adjusted that the current flowing to the meter circuit is substantially zero and the value of said impedance means is a known function of the desired operating impedance.

It is still another object of the invention to provide a device of the foregoing type which requires no variable inductors.

It is still a further object of the invention to provide a device of the foregoing type which is also capable of functioning to determine forward or reverse power and standing wave ratio.

These and further objects and advantages of the invention will become more apparent upon reference to the following specification and claims and the appended drawings wherein:

Figure 1:
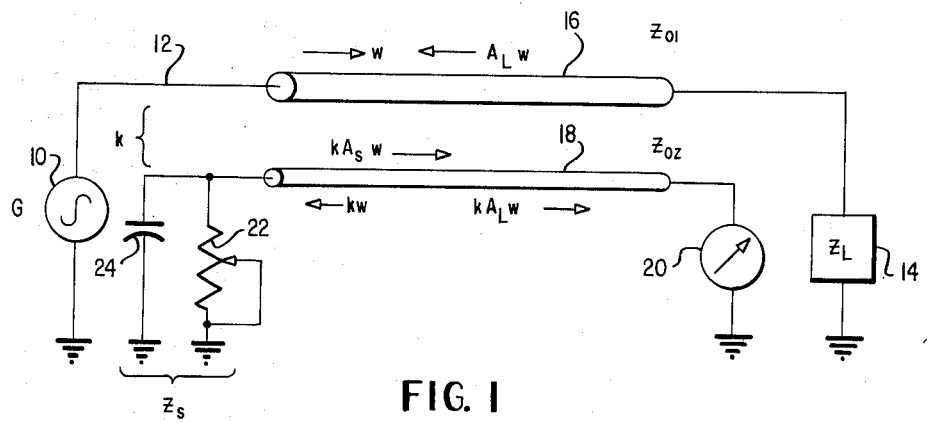
FIGURE 1 is a simplified illustration of an impedance measuring device constructed according to one embodiment of the invention.

Referring to FIGURE 1, there is seen a signal generator G, indicated at 10, which, for example, may be a radio transmitter. The transmitter is connected through a transmission line 12 to a load $Z_L$ indicated at 14, the load commonly being some type of antenna. The circuit between the generator G and the load $Z_L$ is interrupted by a short length of transmission line 16 forming a part of the impedance measuring device. The transmission line 16 has a characteristic impedance of $Z_{01}$. To this short length of transmission line 16 is lightly coupled a second section of transmission line 18, having a characteristic impedance of $Z_{02}$. The coupling coefficient between the two transmission lines 16 and 18 will be referred to as $k$. Connected to the end of the transmission line 18 nearest the load $Z_L$ is a meter 20. Connected to the other end of the transmission line 18 is a variable standard resistance 22 and a variable standard reactance 24, the combination of resistance and reactance being identified collectively as the standard impedance $Z_s$.

The generator G transmits power along the transmission line 16 to the load $Z_L$ with the magnitude of this energy being identified as $w$ and moving in the direction indicated by the arrow in FIGURE 1. In the case of a transmitter and antenna, most of this energy is radiated by the antenna. A small part of it, however, is reflected along the transmission line 16 back to the transmitter, the fraction of the wave which is returned being determined by the reflection coefficient of the load. This coefficient is here indicated as $A_L$. The reflected wave of energy on the transmission line 16, therefore, is denoted by $A_L W$ and moves in the direction of the arrow as indicated in FIGURE 1. These two waves $W$ and $A_L W$ in the main transmission line 16 cause two waves $kw$ and $kA_L w$ to be induced in the secondary transmission line 18 moving in the directions of the arrows indicated in FIGURE 1, "$k$" denoting the coefficient of coupling between the main and secondary lines as previously set out. If the standard load impedance $Z_s$ is not equal to the characteristic impedance of the secondary transmission line 18, that is, not equal to $Z_{02}$, a third wave exists on the secondary transmission line of the magnitude $kA_s w$, $A_s$ being the reflection coefficient of the impedance $Z_s$ and the characteristic impedance $Z_{02}$ of the secondary transmission line 18. The direction of travel of this wave is towards the meter as indicated by the arrow in FIGURE 1.

The two waves $kA_s w$ and $kA_L w$ thus arrive at the meter circuit. If these two waves are of equal magnitude and opposite time phase, the meter indication will be zero. The null condition of the bridge may therefore be expressed as:

$$kA_L W = -kA_s w \quad (1)$$

Or, $$A_L = -A_s \quad (2)$$

The reflection coefficients are, of course:

$$A_L = \frac{Z_L - Z_{01}}{Z_L + Z_{01}}; \quad A_s = \frac{Z_s - Z_{02}}{Z_s + Z_{02}} \quad (3)$$

Replacing $A_L$ and $A_s$ in Equation 2 with these values and solving for $Z_L$:

$$\frac{Z_L - Z_{01}}{Z_L + Z_{01}} = \frac{Z_s - Z_{02}}{Z_s + Z_{02}} \quad (4)$$

$$Z_L Z_s = Z_{01} Z_{02} \quad (5)$$

$$Z_L = \frac{Z_{01} Z_{02}}{Z_s} \quad (6)$$

Or, $$Z_L = Y_s (Z_{01} Z_{02}) = Y_s C \quad (7)$$

It can thus be seen that the load impedance $Z_L$ is directly proportional to the shunt admittance of the standard circuit or impedance $Z_s$. The constant of proportionality is identified as C and is the product of the characteristic impedance of the main transmission line 16 and of the secondary transmission line 18. This constant is independent of frequency so that the standard impedance circuit $Z_s$ using a parallel connected variable resistance element and a variable reactance element (either a capacitance or an inductance, as the case may be) may be calibrated directly in terms of the series equivalent load impedance $Z_L$. When this is done, the unknown impedance $Z_L$ may be readily determined by adjusting the standard resistance and reactance until the meter 20 nulls or reads zero. At this time, the unknown load impedance $Z_L$ may be read directly from the standard resistance and reactance in terms of resistive and reactive components.

Figure 4:
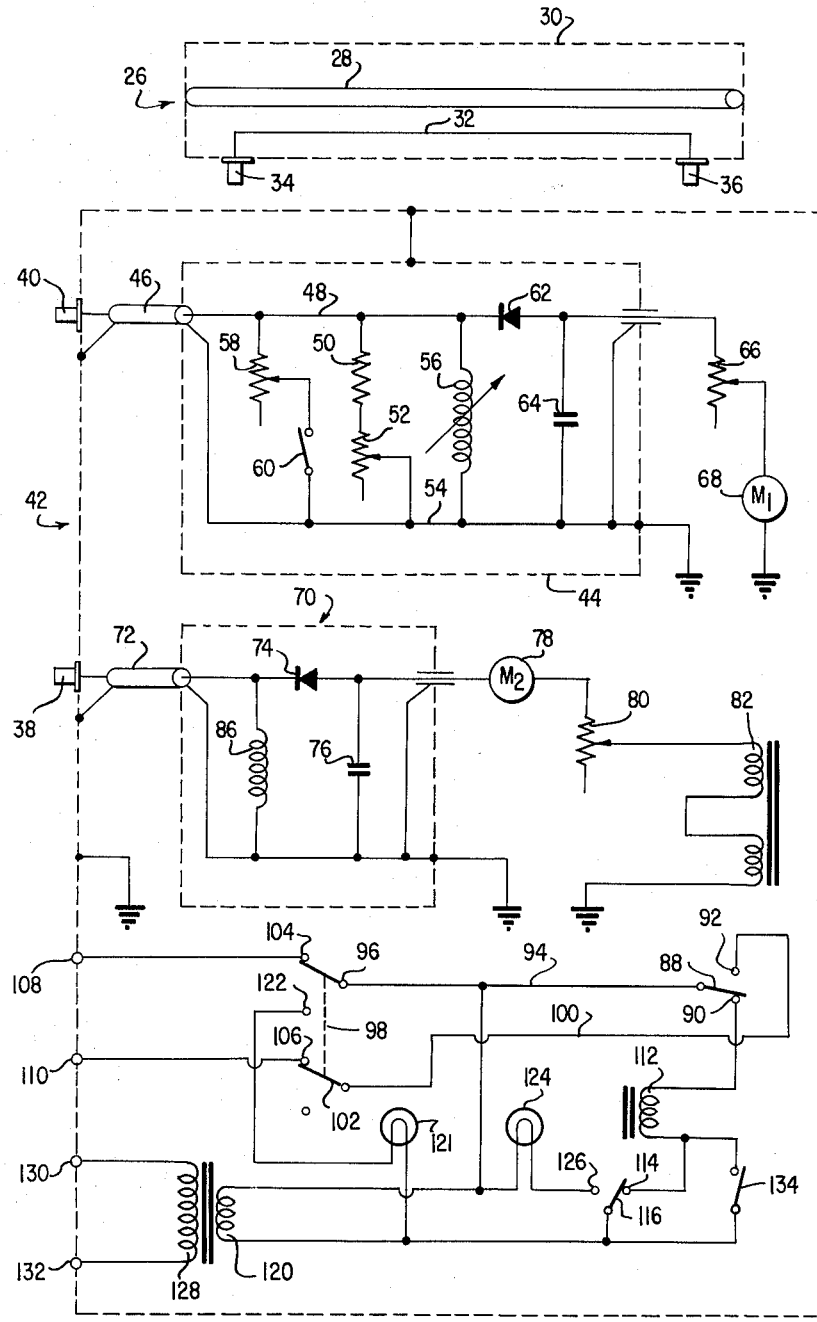
FIGURE 4 is a circuit diagram of an impedance monitoring device constructed according to another embodiment of the invention.

Referring to FIGURE 4, there is shown an embodiment of the invention constructed in the manner illustrated in FIGURE 1 but adapted to perform an impedance monitoring and alarm function. In this figure there is seen the transmission line insertion unit or coupling box 26, which may consist of a heavy central conductor 28 in a metal cabinet indicated at 30, the transmission line section 28 being connected in the transmission line extending between a transmitter and antenna. A secondary transmission line 32 is mounted adjacent the primary transmission line 28 and is connected at its opposite ends to coaxial connectors 34 and 36. The coaxial connectors 34 and 36 are connected by suitable coaxial cable to coaxial connectors 38 and 40 on the metal cabinet of the control unit indicated generally at 42. Mounted within the metal cabinet of the control unit 42 is a first shielded compartment 44 connected to the coaxial connector 40 by means of a short length of coaxial line 46. The center conductor 48 of the coaxial cable 46 is connected to a terminating resistor comprising a fixed resistor 50 and a variable resistor 52, the latter being connected to the ground conductor 54 of the coaxial cable 46. A variable inductor 56 is provided across the conductors 48 and 54 in order to parallel resonate the capacity of the coaxial coupling cable between the insertion or coupling box and the control box so that both positive and negative susceptances may be accomplished by varying this coil.

An additional load resistor 58 is connected across the conductors 48 and 54 through a pushbutton switch 60. This resistor is provided as a fault simulator which may be preset to simulate a fault or deviation of impedance of a given magnitude. A volt meter circuit consisting of diode 62 and capacitance 64 is connected through a sensitivity adjustment resistor 66 to a suitable volt meter 68.

A separately shielded detector box indicated generally at 70 is connected to the coaxial connector 38 by a short length of coaxial cable 72. This box houses a simple diode voltmeter circuit consisting of diode 74 and capacitance 76, which are connected to a meter 78 and thence through a variable sensitivity resistor 80 to a protection relay 82. An inductance 86 is provided across the coaxial cable 72 to balance the capacitance of the coaxial cable connecting the control box to the insertion or coupling box.

The relay 82 when energized, attracts a relay armature 88 from engagement with a stationary contact 90 into engagement with a stationary contact 92. The armature 88 is connected through a conductor 94 to one swinger 96 of a double pole double throw disable switch indicated generally at 98. The contact 92 is connected through conductor 100 to the other swinger 102 of this same switch. The terminals 104 and 106 of switch 98 are connected to control terminals 108 and 110 on the control box 42. These terminals may be connected to the arc suppression circuit of the transmitter so that when the relay 82 is energized to complete a circuit between terminals 108 and 110, the carrier of the transmitter is momentarily interrupted.

The relay 82 also operates a fault indicator circuit. Thus, the terminal 90 of relay 82 is connected to the coil of a second relay 112, having its other terminal connected to contact 114. The swinger 116 of the relay 112 is connected through conductor 118 to one side of a transformer secondary 120 and to a disable indicator lamp 121. The other side of the lamp 121 is connected to the contact 122 of the double pole, double throw disable switch 98. The other terminal of the transformer secondary 120 is connected to the swinger 96 of the disable switch 98 and also to a fault indicator lamp 124. The other terminal of the fault indicator lamp is connected to contact 126 associated with relay 112. The primary 128 for the secondary 120 is connected to a pair of terminals 130 and 132 on the control box 42. A pushbutton switch 134 is provided around the contacts 114 and 116 of the relay 112.

The pushbutton switch 134 associated with relay 112 is initially depressed or closed to cause energization of relay 112 and closure of its contacts 114–116 to lock the relay 112 in an energized condition. When a fault occurs and the relay 82 is energized, the circuit to relay 112 is broken, swinger 116 engages contact 126, and the fault indicating lamp 124 is illuminated. After the fault has been cleared, this fault indicator circuit may be reset by manually depressing the pushbutton switch 134. The double pole double throw switch 98 is provided as a disable switch to disconnect the protection circuit from the transmitter. When this switch is in the disable position, the disable lamp 121 is illuminated.

The unit of FIGURE 4 may be installed in the following manner. The insertion or coupling box 30 is connected in the transmission line and the control box 42 is installed on the transmitter panel near the insertion or coupling unit. The coaxial cables are connected between the insertion unit and the control box making certain that the cable coming from the transmitter end of the secondary transmission line 32 is connected to the load connector 40 on the control box and that the cable coming from the antenna end of the secondary transmission line 32 is connected to the detector coupling 38 on the control box. A 120 volt A.C. power supply is connected to the terminals 130 and 132 and the transmitter arc control circuit wires are connected to the terminals 108 and 110.

When power is supplied to the control box 42 the fault indicator light 124 should immediately come on. If the disable switch 98 is in the disable position, the disable indicator light 121 will also be illuminated. These two lamps may be extinguished by throwing the disable switch up to its normal operating position and by depressing the fault reset button of the switch 134.

With the transmitter operating, the meter 78 should read some current. If this current is excessive, the relay 82 will operate and the fault indicator lamp 124 will be energized. The disable stitch must be in the down position during the preliminary adjustments so as not to affect the operation. The variable resistor 52 should now be adjusted along with the variable inductance 56 for a minimum reading of the meter 78. At this time the current flowing through the meter 78 will be insufficient to energize the relay 82 and depression of the reset switch 134 will extinguish the fault indicator lamp 124. The simulated fault resistor 58 should now be adjusted to a value to simulate the termination impedance change that will just operate the protector circuit. As an example, a 10% variation from the measured termination resistance may be utilized.

With the fault switch 60 closed the reverse sensitivity resistor 80 should now be advanced from its full counterclockwise position until the fault indicator 124 lights. The unit is now ready for operation in the manner described.

While the embodiments of the invention shown in FIGURES 1 and 4 are quite useful for many purposes, they have several limitations as general purpose measuring instruments. For example, if the load impedance $Z_L$ is zero, the standard shunt resistance $R_s$ is required to be infinite. Also, if the reactive component of the load is inductive, a variable capacitance may be used as a standard. On the other hand, if the reactive component of the load is capacitive, a variable inductor is required for the standard circuit and a satisfactory variable inductor of sufficiently high Q is difficult to obtain. These difficulties may be overcome by resorting to the embodiment of the invention illustrated in FIGURES 2 and 3.

Figure 2:
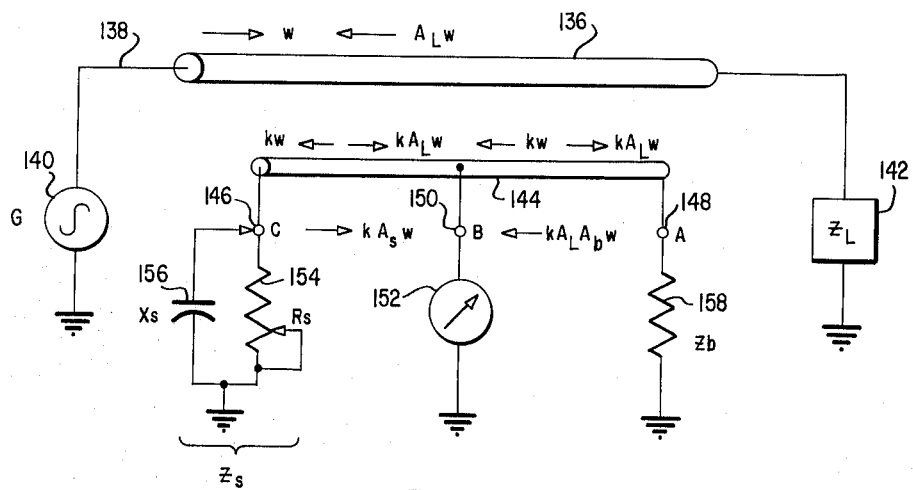
FIGURE 2 is a simplified illustration of an impedance measuring device constructed according to another embodiment of the invention.

Referring to FIGURE 2, there is shown a main or primary transmission line 136 connected in the transmission line 138 between a generator G indicated at 140 and a load $Z_L$ indicated at 142. As in the preceding embodiments of the invention, a secondary transmission line 144 is lightly coupled to the main transmission line 136 and is provided with end terminals 146 and 148. In this case, however, the secondary transmission line 144 is also provided with a center terminal 150.

In this embodiment of the invention, the secondary transmission line 144 between the terminals 146 and 150 is used as the secondary line of the embodiment of the invention of FIGURES 1 and 4 and has a meter 152 connected to terminal 150 and parallel connected variable resistor 154 and variable capacitor 156 connected to the terminal 146, the variable standard capacitor and resistor being collectively referred to as $Z_s$. The line section between the terminals 148 and 150 is referred to as the bias line section and has a biasing impedance $Z_b$ indicated at 158 connected to terminal 148.

Once again the main transmission line 136 carries oppositely traveling waves W and $A_L w$ which induce waves $kw$ and $kA_L w$ in the secondary transmission line 144. These waves move in the directions indicated by the arrows in FIGURE 2. Also found in this secondary transmission line 144 are the reflected waves $kA_s w$ and $kA_L A_b w$, $A_s$ and $A_b$ representing reflection coefficients. As in the embodiment of the invention illustrated in FIGURE 1, the total of the waves arriving at the meter circuit is added and equated to zero. This results in:

$$A_s + A_L + 1 + A_L A_b = 0 \qquad (8)$$

When these reflection coefficients are replaced by their defining impedance ratios, as before, and the resulting equation is solved for $Z_L$, the results are:

$$Z_L = \frac{C}{2} Y_s - \frac{C}{2} Y_b \qquad (9)$$

This equation assumes an exact center tap of the secondary line, which is preferred, although other tap ratios may be used but with some modification of the equation. It will be noted that this equation is similar to Equation 5 except that a negative term has been added. This means that the negative value of the bias admittance $Y_b$ is effectively in parallel with the admittance of the standard $Y_s$.

It will thus be seen that the two previously discussed limitations of the embodiment of FIGURES 1 and 4 are now circumvented, and the requirement for an infinite resistance standard no longer exists. That is to say, when $Z_L$ is zero, it is only necessary that $Y_s$ and $Y_b$ are equal, neither being required to be zero. Nor is it necessary to have a variable inductor for capacitive loads. The variable capacitor standard 156 may be switched from terminal 146 to terminal 148. Equation 9 indicates that this has the effect of reversing the sign of the susceptances of this standard.

Figure 3:
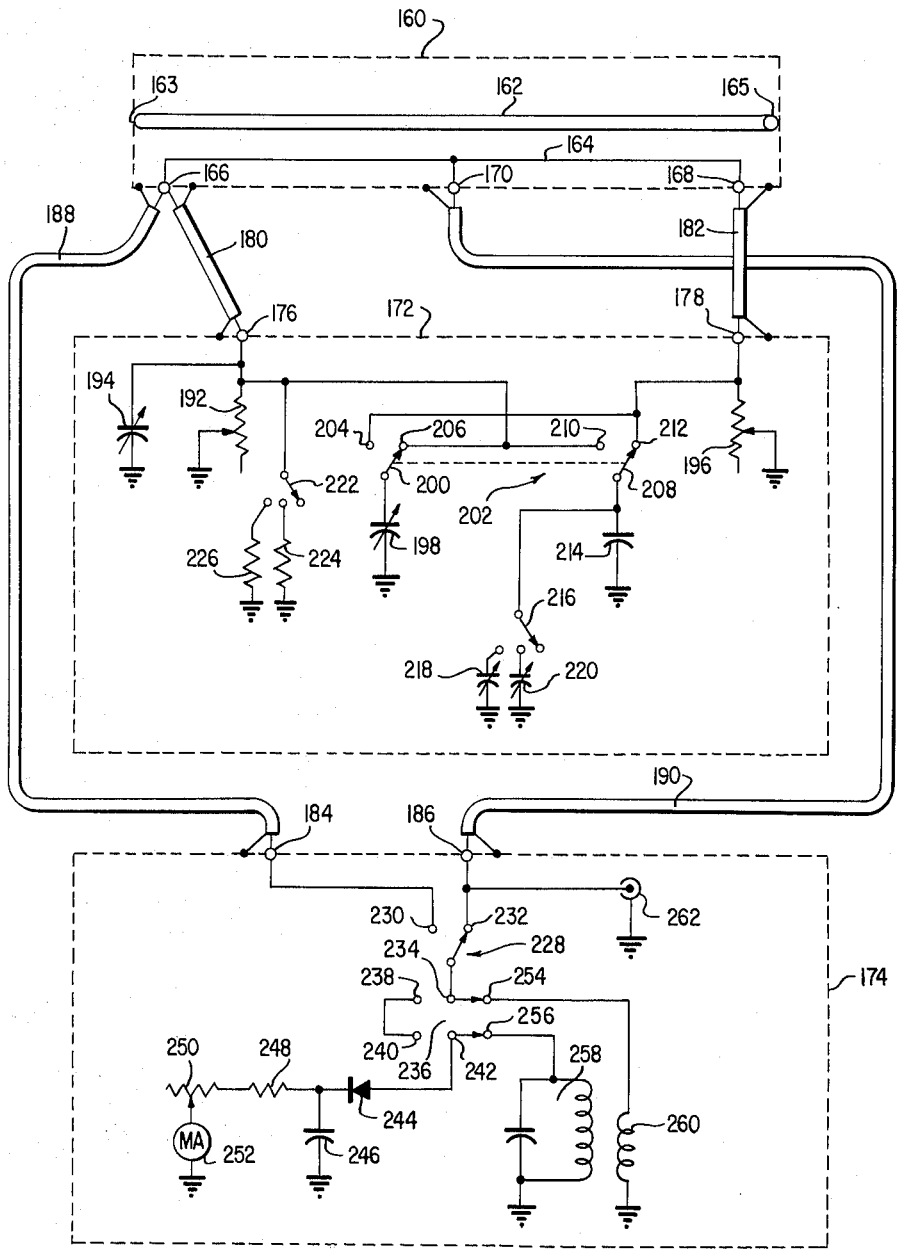
FIGURE 3 is a detailed circuit diagram of an impedance measuring device of the type illustrated in FIGURE 2.

Referring to FIGURE 3, there is seen the schematic diagram of a complete circuit for a practical bridge constructed in accordance with the principles described in connection with FIGURE 2. The coupling or insertion box is indicated at 160 and contains the main transmission line 162 and the secondary transmission line 164. The end 163 of the transmission line 162 is connected to the generator (or transmitter) while the end 165 is connected to the load impedance (or antenna). Terminals 166 and 168 are provided at the ends of the secondary transmission line 164 while terminal 170 is provided at its center point. A bridge section is provided in a shielding box 172 while a meter circuit section is provided in a separate shielding box 174, the shielding boxes 172 and 174 being mountable in an instrument box as in the embodiment of the invention illustrated in FIGURE 4. The bridge section box 172 is provided with a pair of terminals 176 and 178, the terminal 176 being intended for connection to coupler box terminal 166 and the terminal 178 being intended for connection to coupler box terminal 168, as indicated by the coaxial cables 180 and 182. The meter circuit box 174 is provided with a pair of terminals 184 and 186 which are similarly connected by coaxial cables 188 and 190 to the terminals 166 and 170.

The bridge section 172 is provided with a shunt standard resistor 192 which may be directly driven by a dial on the face of the bridge and calibrated directly in ohms.

A bias or zero set resistor 196 is shunted between the terminal 178 and ground while a bias or zero set capacitor 198 is connected between ground and the swinger 200 of a double pole double throw L/C switch indicated at 202. The L/C switch 202 has a pair of contacts 204 and 206 associated with the swinger 200 and these are respectively connected to the terminal 178 and the terminal 176. The other swinger 208 of the switch 202 is associated with stationary contacts 210 and 212 which are respectively connected to terminals 176 and 178. The swinger 208 is in turn connected to a grounded standard variable capacitor 214 and to the swinger 216 of a selector switch capable of inserting scale extension capacitors 218 and 220. A similar scale extension switch 222 is provided to insert scale extension resistors 224 and 226.

The switch 202 may be referred to as the L/C switch in that it shifts the reactive standard 214 and from terminal 178 (for capacitive loads) to terminal 176 (for inductive loads) and shifts the zero set capacitor 198 in a converse fashion. The range extension components 218, 220, 224 and 226 may be switched directly across the standards 214 and 192 and have the effect of adding a fixed equivalent load of resistance or reactance to the dial readings. As an example, if the plus 100-ohm scale extension resistor is switched in and a dial reading of 10 ohms is obtained, it indicates a load resistance of 110 ohms. The lead inductance compensation capacitor 194 is provided to balance out the inductive reactance in the connecting cables.

Referring to the meter circuit box 174, a forward-reverse switch 228 is provided and has its contacts 230 and 232 connected to the terminals 184 and 186 respectively. The swinger in turn is connected to one terminal 234 of a double pole double throw sensitivity switch 236. The terminals 238 and 240 of the sensitivity switch 236 are short circuited. The terminal 242 is connected to a diode meter circuit consisting of diode 244, capacitor 246, resistors 248 and 250, and meter 252. The other terminals 254 and 256 of the switch 236 are connected to a tuned coupler including the tuned circuit 258 and the link coupling 260. An external detector connection 262 may also be provided by a connection to the terminal 186.

The meter circuit forward-reverse switch 228 is normally in the reverse (contact 232) position for bridge operation for measuring operating impedance. In this position, the meter circuit is connected directly to terminal 170 of the coupler box 160. The sensitivity switch 236 may be actuated either to select a direct coupling of the meter circuit, or where more sensitivity is desired, coupling may be secured through the tuned coupling network 258–260. The tuned circuit provides added sensitivity in the meter circuit for low power operation and also provides selectivity when desired. The meter circuit may also be switched to the forward direction where it will be connected to terminal 166 of the coupler box and will read the voltage across the standard resistor 192. With the dials set to indicate the $Z_0$ of the circuit being measured, the forward and reverse power and standing wave ratio may be read from the meter by operating the forward and reverse switch. During this operation, the bridge performs as a normal directional coupler.

In order to calibrate the device of FIGURE 3, a zero resistance load is simulated by shorting the main transmission line 162 to ground (the metal coupler box 160) at the load end 165. The L/C switch 202 is then switched to the left position in order to connect the standard reactance 214 to the terminal 176 and the zero set reactance 198 or bias reactance to the terminal 178. The forward-reverse switch 228 in the meter circuit is switched to the reverse position.

The standard resistance 192 is set to zero as is the standard reactance 214. The resistive and reactive scale extension switches may be in the positions shown as may be sensitivity switch 236 in the meter circuit. The bias resistance 196 and the bias reactance 198 are now adjusted for a null of the meter 252. After this setting is once established, these controls need not be returned to during measuring operations and thus may be incorporated as internal adjustments of the unit.

After this adjustment is made, the unit is in readiness to make operating impedance measurements, forward and reverse power measurements, and standing wave ratio measurements.

In utilizing the device for an operating impedance measurement, the forward-reverse switch 228 is put in the reverse position illustrated in FIGURE 3, the sensitivity switch 236 may be in either the sensitive or the direct position, depending upon the power available, and the L/C switch may be in either position. If a null of the meter 252 cannot be obtained with the L/C switch in the original position, it should be reversed to the opposite position whereupon a null should be obtainable by an adjustment of the standard resistor 192 and reactance 214. If the L/C switch is in the left position, the reactive standard 214 reads capacitive reactance, whereas if the L/C switch is in the right position, the reactive standard reads inductive reactance. In the case of the capacitive reactance the dial reading must be divided by the frequency in megacycles, while if the reactance is inductive, the dial reading must be multiplied by the frequency in megacycles. As previously stated, the unit may be used to measure forward power by adjusting the standard impedance dials to the characteristic impedance of the circuit being measured and then switching the forward-reverse switch 228 to forward. Reverse power may similarly be read by returning this switch to its reverse condition.

While the device illustrated and described in conjunction with FIGURE 3 is in the form of a measuring unit, it will be apparent that it could also be used as a monitoring and alarm unit in the same manner as the embodiment of the invention illustrated in FIGURE 4. As an example, the current flowing through the meter 252 may readily be utilized to actuate a control relay such as the relay 82 in the embodiment of the invention illustrated in FIGURE 4.

It will be apparent from the foregoing that according to the present invention there has been provided an improved device for measuring and monitoring the operating impedance of a load under power. In a specific embodiment, the device may be provided to operate over a frequency range of 500 kc. to approximately 5 mc., may have a power handling capacity of approximately 5 kw. and an insertion effect equal to the effect of 9 inches of 150-ohm coaxial cable. It is thus apparent that the unit causes a minimum insertion loss or effect, is capable of operating over a wide frequency range and of handling a large amount of power. There is no theoretical limit to the amounts of power which may be handled and even considerably higher powers may be fed through the unit without resorting to the use of unduly expensive components. The unit is relatively simple in construction and operation and may be produced for a moderate cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An operating impedance determining device comprising a coupling unit containing a first section of transmission line for connection between a generator and the impedance to be measured, and a second section of transmission line coupled to the first, meter means coupled to said second section of transmission line at a first point and to a conductor of reference potential, impedance means coupled to said second section of transmission line at a second point and to a conductor of reference potential, said impedance means having both resistive and reactive components that are variable, said impedance means being adjustable to a value different than the characteristic impedance of said second section of transmission line to create a reflected wave of an amplitude and phase to cause the current flowing through said meter means to be substantially zero, at which time the value of said impedance means is a known function of the operating impedance to be measured.

2. An operating impedance determining device comprising a coupling unit containing a first section of transmission line for connection between a generator and the impedance to be measured, and a second section of transmission line coupled to the first, current responsive means terminating one end of said second section of transmission line, impedance means terminating the other end of said second section of transmission line, said impedance means having both resistive and reactive components that are variable, said impedance means being adjusted to a value different than the characteristic impedance of said second section of transmission line to create a reflected wave of an amplitude and phase to cause the current flowing through said current responsive means to be substantially zero, at which time the value of said impedance means is a known function of the operating impedance to be measured.

3. An operating impedance determining device comprising a coupling unit containing a first section of transmission line for connection between a generator and the impedance to be measured, and a second section of transmission line coupled to the first, current responsive means coupled to said second section of transmission line at a first point and to a conductor of reference potential, impedance means coupled to said second section of transmission line at a second point and to a conductor of reference potential, said impedance means having both resistive and reactive components that are variable, said impedance means being adjusted to a value different than the characteristic impedance of said second section of transmission line to create a reflected wave of an amplitude and phase to cause the current flowing through said current responsive means to be substantially nulled, and relay means connected in said current responsive means circuit and for controlling an external device in accordance with the current flowing in said current responsive means circuit.

4. A device as set out in claim 1 wherein $A_L = -A_s$, where $A_L$ is the reflective coefficient of the coupling of the first section of transmission line to the impedance to be determined, and $A_s$ is the reflective coefficient of the coupling of the second section of transmission line to said impedance means.

5. A device as set out in claim 3 wherein $A_L = -A_s$, where $A_L$ is the reflective coefficient of the coupling of the first section of transmission line to the impedance to be determined, and $A_s$ is the reflective coefficient of the coupling of the second section of transmission line to said impedance means.

6. A device as set out in claim 1 wherein said impedance means includes a pair of variable resistance means connected to said second section of transmission line at spaced positions, said meter means being connected to said second section of transmission line intermediate the connections of said pair of resistance means.

7. A device as set out in claim 6 including a variable capacitive means connected across each of said resistance means.

8. A device as set out in claim 7 including switching means for reversing the connections of said capacitive means and connecting them across opposite resistance means.

9. A device as set out in claim 7 wherein said spaced positions at which said resistance means are connected to said second section of transmission line are referred to as standard and bias positions, and wherein:

$$A_s + A_L + 1 + A_L A_b = 0$$

where $A_s$ is the reflective coefficient of the coupling of the first section of transmission line to the impedance to be determined, $A_s$ is the reflective coefficient of the coupling of the second section of transmission line at the standard position, and $A_b$ is the reflective coefficient of the coupling of the second section of transmission line at the bias position.

10. An impedance determining device for determining the operating impedance of a load comprising a first section of transmission line adapted to be connected between a generator and said load, a second section of transmission line coupled to said first section, said second section of transmission line having three spaced terminals connected thereto, the outer terminals being substantially equally spaced from the center terminal, meter means connected to said second section of transmission line at said center terminal and to a conductor of reference potential, separate variable resistance means connected to said second section of transmission line at each of said outer terminals and to a conductor of reference potential, separate variable capacitance means connected across said separate resistance means, and switch means for interchanging the connections of said separate capacitance means so that they are connected across the opposite variable resistance means.

References Cited by the Examiner

UNITED STATES PATENTS

| | | | |
|---|---|---|---|
| 1,897,688 | 2/1933 | Ambronn | 324—1 |
| 2,523,254 | 9/1950 | Talpey | 324—58 |
| 2,606,974 | 8/1952 | Wheeler | 324—58 X |
| 2,808,473 | 10/1957 | Romander | 324—57 X |
| 2,808,566 | 10/1957 | Douma | 324—58 X |
| 2,936,417 | 5/1960 | Hedberg | 324—95 |
| 3,145,338 | 8/1964 | Downs | 324—57 X |

FOREIGN PATENTS 948,271  8/1956  Germany.

OTHER REFERENCES

Glinski: Tele-Tech, "Standing-Wave Ratio Meter for VHF," June, 1947, pp. 34–35.

WALTER L. CARLSON, *Primary Examiner.*

A. E. RICHMOND, E. E. KUBASIEWICZ,
*Assistant Examiners.*